UNITED STATES PATENT OFFICE.

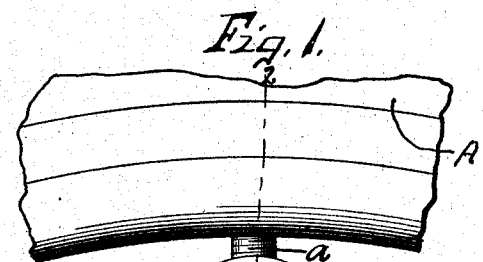
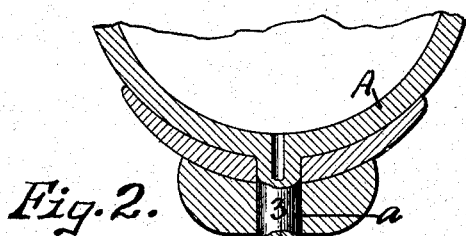
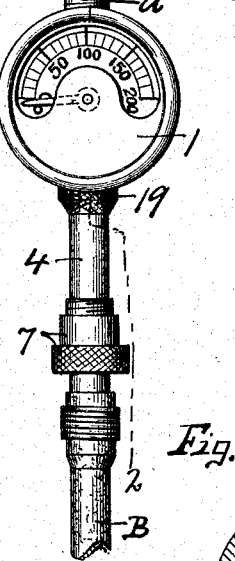
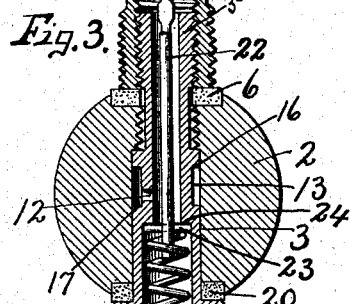
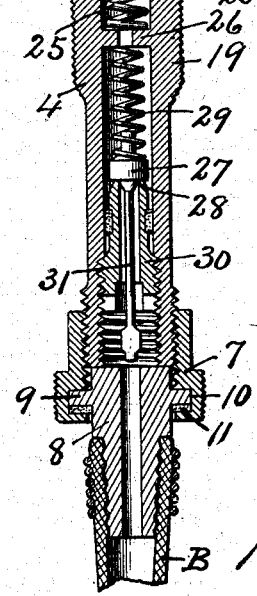
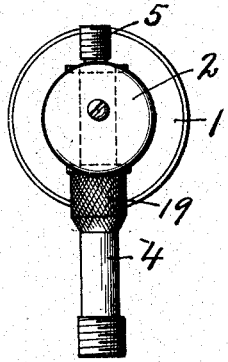
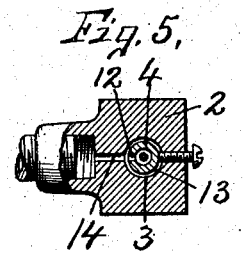
H. W. & G. H. BROWN.
AIR PRESSURE INDICATOR.
APPLICATION FILED JAN. 11, 1909.
945,216.
Patented Jan. 4, 1910.

HENRY W. BROWN AND GARRETT H. BROWN, OF SYRACUSE, NEW YORK.

AIR-PRESSURE INDICATOR.

945,216.   Specification of Letters Patent.   Patented Jan. 4, 1910.

Application filed January 11, 1909. Serial No. 471,683.

*To all whom it may concern:*

Be it known that we, HENRY W. BROWN and GARRETT H. BROWN, of Syracuse, in the county of Onondaga, in the State of New York, have invented new and useful Improvements in Air-Pressure Indicators, of which the following, taken in connection with the accompanying drawings, is a full, clear, and exact description.

This invention relates to certain improvements in air pressure indicators adapted to be placed in the connection between an air compressor and pneumatic tire of automobiles and similar vehicles in which inflated tires or tire sections are employed.

Our main object is to produce a pressure register which may be attached directly to the usual valve nipple of the tire and which may be made of a minimum number of parts and permanently or detachably connected to the end of a flexible hose leading to an air compressor of a reservoir or pump in which the compressed air has been stored.

We are aware that it is not new to connect a pressure register directly to the nipple of a tire but one of the specific objects of our present invention is to provide the registering device with a valve and a casing therefor, which latter is rotatable bodily in the base of the registering device, and adapted to be screwed directly into the nipple of the tire.

Another object is to provide this same valve casing with means whereby the valve in the tire nipple will be automatically opened by the operation of screwing the valve casing into the nipple, the latter operation being effected without rotating the indicator or adjusting any of the other parts of the registering device.

A further object is to enable the valve casing to be removed from the base of the indicator and replaced by a new one without the removal of any of the other parts.

Other objects and uses will appear in the following description.

In the drawings—Figure 1 is a face view of our improved registering device shown as operatively connected to a portion of a pneumatic tire and to a flexible hose, the latter being adapted to be connected to an air pump or other source of supply for compressed air. Fig. 2 is a longitudinal sectional view taken on line 2—2, Fig. 1. Fig. 3 is an enlarged sectional view taken on line 3—3, Fig. 2. Fig. 4 is a rear elevation of the detached registering device, and Fig. 5 is a sectional view taken on line 4—4, Fig. 2.

This pressure register comprises an ordinary pressure indicator —1— which is screwed into a suitable base —2— having a lengthwise opening —3— therethrough in which is journaled a rotary valve casing —4— as best seen in Fig. 2. This valve casing extends entirely through the opposite ends of the base —2— and is provided at one end with a threaded extension —5— wholly exterior to the base —2— and adapted to be screwed into the usual tire nipple —a— of a tire —A—, a suitable packing ring or washer —6— being interposed between the end of the tire nipple —a— and adjacent face of the indicator base —2— and surrounds the adjacent portion of the valve casing —4— to prevent leakage of air at this joint. The opposite end of the valve casing which extends beyond the adjacent side of the base —2— is also threaded for receiving a threaded coupling —7—, the latter being rotatably interlocked with a coupling —8— which in turn is secured to one end of a flexible hose or pipe —B—. The rotatable connection between the coupling sections —7— and —8— is established by providing the section —8— with an annular flange —9— and crimping the adjacent end of the section —7— inwardly around the flange —9—, thus forming an annular groove —10— in the adjacent end of the section —7— in which the flange —9— is loosely seated to permit the latter section 7 to be screwed upon the adjacent end of the valve casing —4— without rotating the flexible hose —B—, a suitable packing —11— being interposed in the joint between the flange —9— and outer side of the groove —10— before such crimping to prevent leakage of the air therethrough.

The valve casing —4— is provided with a lengthwise passage extending therethrough from end to end and the portion of the valve casing which extends through the base —2— is provided with a lateral radial branch passage —12— communicating with an annular groove —13— in the periphery of the valve casing, said groove being registered with a branch passage —14— in the base —2— to establish communication between the interior of the valve casing and pressure indicator —1—.

In cutting the annular groove —13— in the periphery of the valve casing to register with the branch passage —12—, opposite annular shoulders —16— and —17— are formed, one of which as the shoulder —16— is engaged by a limiting stop consisting, in this instance, of a screw —18— screwed into the rear side of the base —2— to prevent accidental withdrawal of the valve casing from said base and at the same time by simply unscrewing the screw —18— a sufficient distance to clear the opening —3—, said valve casing may be readily withdrawn from the casing —2— for repairs or replacement by a new one if necessary.

A considerable portion of the valve casing within the base —2— is fitted with an easy turning fit in the opening —3— to permit said valve casing to be readily turned or rotated in said base when connecting the device to the tire nipple as previously described.

The portion of the valve casing at the end of the base —2— opposite to that nearest the tire is provided with an annular enlargement —19— which is preferably knurled to form a convenient hand gripping surface whereby the valve casing may be turned in the base —2— in attaching the device to the nipple —a—, a suitable packing —20— being interposed between the contiguous faces of the enlargement —19— and base —2— to prevent leakage of the air at this joint. It is now clear that by screwing the threaded nipple —5— of the valve casing into the tire nipple —a—, the entire device will be drawn upward toward the tire until the end of the tire nipple engages the packing —6— and by continued screwing, the packings —6— and —20— will be drawn up tightly to prevent leakage at these joints.

Located within the tire nipple —a— is the usual valve —c— which is normally forced against a seat —d— by the usual spring —e— when the registering device is disconnected from the tire, said valve seat being formed upon the inner end of the usual adjustable sleeve or bushing —f— located within the tire nipple —a—.

The valve —c— is provided with the usual outwardly extending stem —g— which normally projects outwardly a sufficient distance beyond the bushing —f— to be engaged by a stem —22— in the adjacent end of the valve casing —4— when the latter is operatively connected to the tire nipple in the manner shown in Fig. 3. This valve operating stem —22— extends from the nipple —5— some distance beyond the branch passage —12— and is of somewhat smaller diameter than the opening through which it passes to permit free passage of the air through the valve casing to the tire and also to the indicator —1—, the inner end of said valve stem —22— being provided with a pin —23— which is forced against a shoulder —24— in the valve casing by a spring —25—, the latter being of greater power than the spring —e— so as to open the tire valve —c— against the action of this spring —e— when the pressure registering device is connected to the tire but is still capable of yielding in case the valve —c— is brought to a stop or limit of its opening movement, said spring —25— being interposed between the head —23— and shoulder —26— on the interior of the valve casing —4—.

A valve —27— is located in the valve casing —4— some distance beyond the indicator base —2— and is normally forced against a seat —28— by a spring —29— which is interposed between the shoulder —26— and adjacent end of the valve —27—.

The valve seat —28— is formed on the inner end of a bushing —30— which is screwed into the end of the valve casing —4— and has a central opening therethrough for the reception of the stem —31— of the valve —27— whereby said valve —27— may be opened from the outer end of the valve casing when the coupling —7— is disconnected.

In operation assuming that the flexible hose —B— is connected to the source of supply for compressed air and that the coupling —7— is connected to the valve casing —4— which latter is attached to the valve nipple —a— of the tire during which latter operation the valve —c— will be opened by the stem or spindle —22—. Now by allowing the compressed air to flow through the flexible hose —B—, it will automatically open the valve —27— and pass entirely through the casing into the tire and also into the pressure indicator —1— through the branch passages —12— and —14— thereby inflating the tire and at the same time indicating the pressure of the air in such tire. As soon as the tire is inflated to the desired degree of pressure, the valve casing —4— is unscrewed from the tire nipple —a— allowing the valve —c— to be closed by the spring —e— whereupon the source of supply of air may be shut off from communication with the valve casing —4— by any well known shut-off device not necessary to herein illustrate or describe and the valve casing together with the indicator may remain connected to the flexible hose —b— and may be readily detached therefrom by simply unscrewing the coupling —7—.

What we claim is:

1. In a pressure register for pneumatic tires, a pressure indicating device and support therefor, a valve casing rotatably mounted in and extending entirely through said support and having a threaded nipple at one end for connection with the tire nipple, and its other end provided with means for connection with the source of supply for the compressed air, said valve casing and base being provided with communicating passages leading to the indicator, and a check valve in said valve casing.

2. In combination with the valve nipple and valve of a pneumatic tire, a pressure indicator and supporting base therefor, a valve casing rotatable in and extending entirely through the base and connected to the tire nipple, said valve casing and base having connected passages communicating with the pressure indicator, a check valve in the valve casing, yielding means in the valve casing for opening the valve in the tire nipple as said casing is connected thereto, and movable means for retaining the valve casing in the base against endwise movement.

3. In a pressure registering device for pneumatic tires, in combination with the valve nipple of the tire, a base having a lengthwise opening therethrough and a radial branch passage leading from said opening, a pressure indicator secured directly to said branch passage, a valve casing journaled in said lengthwise opening and extending beyond the opposite ends thereof, the inner end of the casing being screw-threaded and engaged with the valve nipple, a check valve in the outer end of the valve casing, a spring for closing the check valve, and a spring pressed valve operating stem within the valve casing for opening the valve in the tire nipple as the valve casing is screwed to said nipple, said valve casing being provided with an annular groove in its periphery registering with the branch opening in the base and also provided with an aperture leading from the groove to the interior of the valve casing.

4. In a pressure indicating device for pneumatic tires in combination with the valve nipple of the tire, a pressure indicator and supporting base therefor, a valve casing journaled in and extending entirely through and beyond the opposite ends of the base and having one end screwed into said tire nipple, said valve casing being removable endwise from the journaled opening in the base and provided with a branch opening communicating with the indicator, and movable means for holding the valve casing against endwise movement in the base.

In witness whereof we have hereunto set our hands this 10th day of December, 1908.

HENRY W. BROWN.
GARRETT H. BROWN.

Witnesses:
H. E. CHASE,
HOWARD P. DENISON.